(12) United States Patent
Aoe et al.

(10) Patent No.: US 10,828,684 B2
(45) Date of Patent: Nov. 10, 2020

(54) STEEL-PRODUCTS SHAPE MEASUREMENT DEVICE AND STEEL-PRODUCTS SHAPE CORRECTION DEVICE

(71) Applicant: JFE Steel Corporation, Tokyo (JP)

(72) Inventors: Shinichiro Aoe, Tokyo (JP); Jun Eto, Tokyo (JP); Masaru Miyake, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 16/481,580

(22) PCT Filed: Jan. 30, 2018

(86) PCT No.: PCT/JP2018/002954
§ 371 (c)(1),
(2) Date: Jul. 29, 2019

(87) PCT Pub. No.: WO2018/143187
PCT Pub. Date: Aug. 9, 2018

(65) Prior Publication Data
US 2019/0388945 A1  Dec. 26, 2019

(30) Foreign Application Priority Data

Jan. 31, 2017 (JP) .................................. 2017-015010

(51) Int. Cl.
*B21D 1/06* (2006.01)
*G01B 11/24* (2006.01)

(52) U.S. Cl.
CPC ................ *B21D 1/06* (2013.01); *G01B 11/24* (2013.01)

(58) Field of Classification Search
CPC ........ G01B 11/306; G01B 11/24; B21D 1/06; C25D 11/16; C25D 11/18; G01N 21/8916; G01N 21/474; G01N 21/9501
See application file for complete search history.

(56) References Cited

U.S. PATENT DOCUMENTS 4,589,972 A * 5/1986 Pompea ................. C25D 11/16
  205/205
4,618,552 A * 10/1986 Tanaka ..................... G03G 5/10
  430/4

(Continued)

FOREIGN PATENT DOCUMENTS

CN   1416974 A   5/2003
CN   1825067 A   8/2006

(Continued)

OTHER PUBLICATIONS

Notice of Reasons for Refusal for Japanese Application No. 2018-565557, dated Nov. 5, 2019, with translation, 7 pages.

(Continued)

*Primary Examiner* — Sang H Nguyen
(74) *Attorney, Agent, or Firm* — RatnerPrestia

(57) ABSTRACT

Provided are a steel-shape measurement device and a steel-shape correction device. The steel-shape measurement device measures a distance to a detection spot group on a to-be-scanned surface of a steel product with a laser rangefinder 5A that measures the distance through scanning of a steel product S with a laser beam emitted from one laser light source 11 and redirected with a galvanometer mirror 13, and measures a shape of the steel product from obtained measured-distance data. The steel-shape measurement device includes an object having a 45°-0° diffuse reflectance of equal to or lower than 10% as a laser-beam absorber 8 at least one portion within an irradiation range irradiated with a regular-reflected laser beam from a to-be-scanned surface of the steel product.

3 Claims, 5 Drawing Sheets

(56) References Cited

U.S. PATENT DOCUMENTS

| | | | | |
|---|---|---|---|---|
| 5,155,558 A | * | 10/1992 | Tannenbaum | G01N 21/57 348/128 |
| 5,188,631 A | * | 2/1993 | L'Esperance, Jr. | A61F 9/00804 606/5 |
| 5,465,214 A | | 11/1995 | Jeuniaux et al. | |
| 5,589,822 A | * | 12/1996 | Stern | B64D 15/20 340/583 |
| 7,907,269 B2 | * | 3/2011 | Meeks | G01N 21/474 250/372 |
| 2003/0090653 A1 | * | 5/2003 | Ogata | G01N 21/8916 356/237.2 |
| 2004/0165642 A1 | * | 8/2004 | Lamont | G02B 7/1821 372/107 |
| 2005/0273011 A1 | * | 12/2005 | Hattery | A61B 5/0059 600/476 |
| 2010/0148432 A1 | * | 6/2010 | Haflinger | B65H 7/14 271/265.02 |
| 2010/0270629 A1 | * | 10/2010 | Tokuda | G01L 9/0042 257/415 |
| 2012/0133760 A1 | | 5/2012 | Markwort et al. | |
| 2015/0226543 A1 | | 8/2015 | Nemoto et al. | |
| 2016/0033626 A1 | | 2/2016 | Hirai et al. | |
| 2018/0270474 A1 | * | 9/2018 | Liu | G06K 9/00201 |

FOREIGN PATENT DOCUMENTS

| | | |
|---|---|---|
| CN | 105665480 A | 6/2016 |
| JP | 05237546 A | 9/1993 |
| JP | 2003016380 A | 1/2003 |
| JP | 2004163240 A | 6/2004 |
| JP | 2010155272 A | 7/2010 |
| JP | 2014087813 A | 5/2014 |
| JP | 2015148570 A | 8/2015 |
| TW | 201619574 A | 6/2016 |
| TW | 201620632 A | 6/2016 |

OTHER PUBLICATIONS

Extended European Search Report for European Application No. 18748049.6, dated Jan. 8, 2020, 7 pages.
Japanese Office Action for Japanese Application No. 2018-565557, dated Jul. 30, 2019, with Concise Statement of Relevance of Office Action, 4 pages.
Taiwanese Office Action for Taiwanese Application No. 107103462, dated Jun. 29, 2018, with Concise Statement of Relevance of Office Action, 4 pages.
Diffuse Reflectance Measurement—Shimadzu Corporation (www.an.shimadzu.co.jp/uv/support/faq/op/solid.htm), Jan. 6, 2017, retrieved from the internet Jul. 17, 2019—3 pages.
International Search Report and Written Opinion for International Application No. PCT/JP2018/002954, dated Mar. 13, 2018—5 pages.
Korean Office Action for Korean Application No. 10-2019-7022525, dated Jul. 27, 2020, with Concise Statement of Relevance of Office Action, 5 pages.
Chinese Office Action for Chinese Application No. 201880009421.7, dated Aug. 4, 2020 with Concise Statement of Relevance of Office Action, 9 pages.

* cited by examiner (a) EXAMPLE A (b) EXAMPLE B

STEEL-PRODUCTS SHAPE MEASUREMENT DEVICE AND STEEL-PRODUCTS SHAPE CORRECTION DEVICE

CROSS REFERENCE TO RELATED APPLICATIONS

This is the U.S. National Phase application of PCT/JP2018/002954, filed Jan. 30, 2018, which claims priority to Japanese Patent Application No. 2017-015010, filed Jan. 31, 2017, the disclosures of these applications being incorporated herein by reference in their entireties for all purposes.

FIELD OF THE INVENTION

The present invention relates to a steel-shape measurement device suitable for measuring off-line the shape of a steel product having a defect such as distortion, and a steel-shape correction device suitable for correcting off-line the shape of a steel product having a defect such as distortion measured by the steel-shape measurement device.

BACKGROUND OF THE INVENTION

Examples of a device that automatically measures the shape of a steel product such as a steel plate includes a device, such as a device described in Patent Literature 1, that includes a measurement device having multiple optical rangefinders on a steel plate transportation line to detect the distance to the surface of the steel plate on the basis of the state of light reflection from the steel plate that passes by the measurement device, that is, to detect the level of the steel plate surface, and to measure the shape of the steel plate surface with the continuous detection of the level of the surface.

However, this steel-plate-shape measurement device is not suitable for measuring the shape off-line. Thus, the applicant has disclosed a steel-plate-shape correction device including a steel-plate-shape measurement device described in Patent Literature 2. The steel-plate-shape measurement device described in Patent Literature 2 measures the distance to a predetermined detection spot group on a stationary steel plate with a laser rangefinder that scans a to-be-scanned surface with a laser beam redirected with a galvanometer mirror after emitted from one laser light source for measuring the distance, and measures the shape of the steel plate from the obtained measured-distance data. "Polarization" in Patent Literature 2 refers to "redirection", that is, a change of the direction.

This structure enables off-line measurement of the shape of the steel plate even in a stationary state.

PATENT LITERATURE

PTL 1: Japanese Unexamined Patent Application Publication No. 5-237546
PTL 2: Japanese Unexamined Patent Application Publication No. 2010-155272

NON PATENT LITERATURE

NPL 1: Diffuse Reflectance Measurement—SHIMADZU CORPORATION (www.an.shimadzu.co.jp/uv/support/faq/op/solid.htm), pp 1/3 to 3/3, Jan. 6, 2017

SUMMARY OF THE INVENTION

The optical rangefinders described in Patent Literature 1 have a problem of causing a large number of abnormal measurements in measuring the shape of a steel-plate surface having a substantially mirror shape. "Substantially mirror shape" here refers to the surface shape that reflects a mirror image of an object with a visually identifiable image quality. However, the steel-plate-shape correction device described in Patent Literature 2 (hereinafter referred to as "Reference Technology A") does not specifically describe a method for solving abnormal measurements of a steel plate having a substantially mirror-shaped steel-plate surface. Thus, the above correction device has a problem of causing abnormal phenomena (abnormal measurements), such as causing measurements largely exceeding a normal variation range in measuring a substantially mirror-shaped steel-plate surface.

Aspects of the present invention have been made in view of the above problems and aims to provide a steel-shape measurement device that can reliably measure the shape of a steel product having a substantially mirror-shaped steel-plate surface on a transport device before and after shape correction and the shape of the steel product under a pressing ram during shape correction, and a steel-shape correction device that can efficiently correct the shape using measurement results of the steel-shape measurement device. Here, steel products collectively refer to steel plates, section steel, and steel sheet piles.

Aspects of the present invention made to solve the above problem are described in paragraphs (1) to (3), below.

(1) A steel-shape measurement device that measures a distance to a detection spot group on a to-be-scanned surface of a steel product with a laser rangefinder that measures the distance through scanning of the steel product with a laser beam redirected with a galvanometer mirror after emitted from one laser light source, and measures a shape of the steel product from obtained measured-distance data, the steel-shape measurement device including an object having a 45°-0° diffuse reflectance of equal to or lower than 10% as a laser-beam absorber at least at one location within an irradiation range irradiated with a regularly-reflected laser beam from the to-be-scanned surface of the steel product.

(2) A steel-shape correction device including a press and transport devices that are disposed on an entry side and an exit side of the press to transport a steel product, the press including a pressing ram, the steel-shape correction device including the steel-shape measurement device described in paragraph (1) on the entry side and the exit side of the press.

(3) The steel-shape correction device according to paragraph (2), wherein a location at which the laser-beam absorber of the steel-shape measurement device is disposed includes a location on a surface of outer surfaces of the press within the irradiation range.

Aspects of the present invention has preferable effects of being capable of reliably measuring the shape of a steel product having a substantially mirror-shaped steel-plate surface on a transport device before and after shape correction and the shape of the steel product under a pressing ram during shape correction, and efficiently correcting the shape using the measurement results.

DETAILED DESCRIPTION OF EMBODIMENTS OF THE INVENTION

Embodiments of the present invention will now be described with reference to the drawings. In the following description, aspects of the present invention described in a paragraph (N) is referred to as "Invention (N)".

Firstly, an embodiment for Invention (1) will be described.

Figure 1:
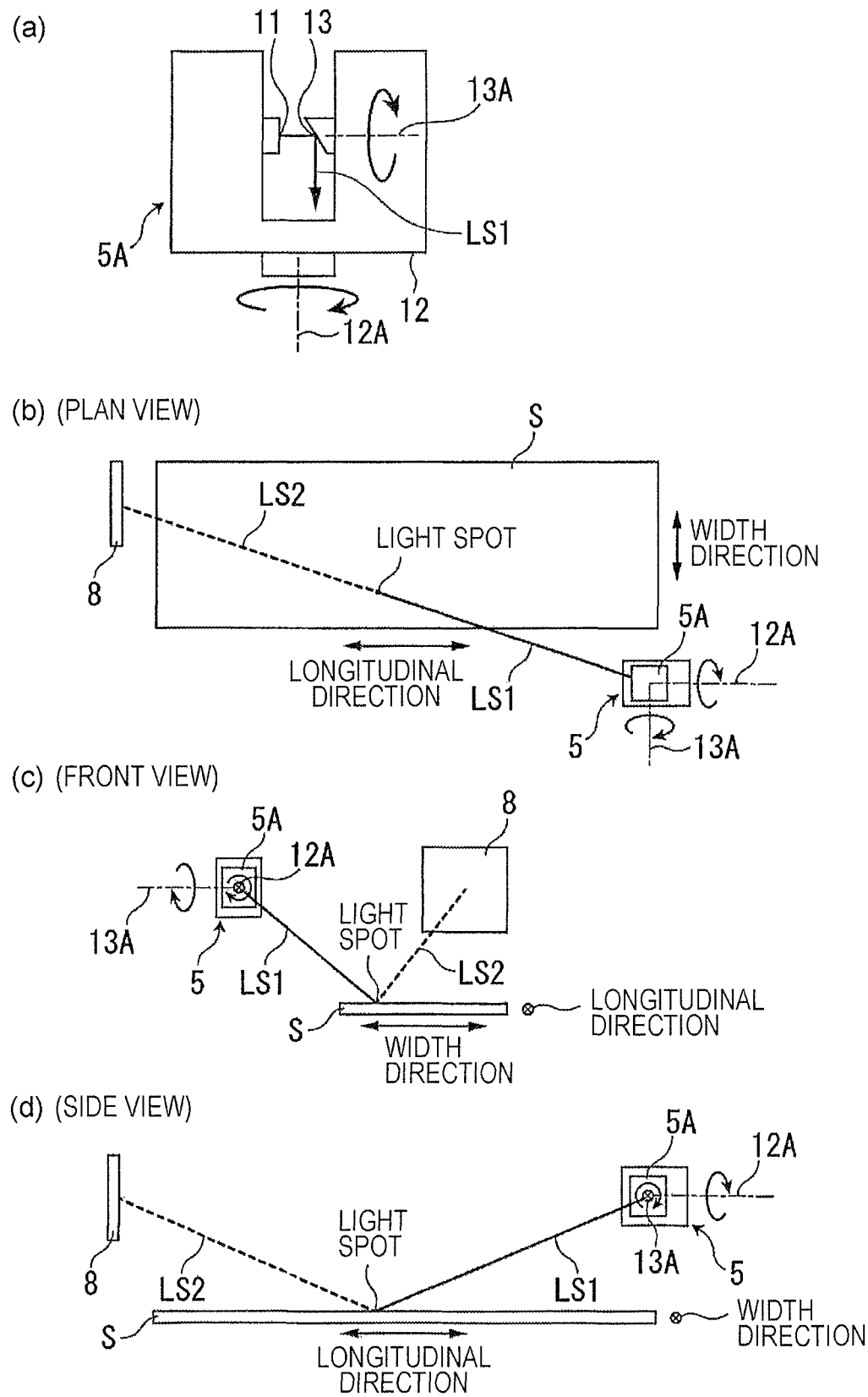
FIG. 1 includes schematic diagrams of a schematic structure of a steel-shape measurement device according to an embodiment of Invention (1).

FIG. 1 includes schematic diagrams of a schematic structure of a steel-shape measurement device of an embodiment for Invention (1), where FIG. 1(a) is a plan view of a laser rangefinder, FIG. 1(b) is a plan view of the entirety of the device, FIG. 1(c) is a front view of the entirety of the device, and FIG. 1(d) is a side view of the entirety of the device.

A steel-shape measurement device of an embodiment for Invention (1) measures the distance to a predetermined detection group of a to-be-scanned surface of a steel product with a laser beam, and measures the shape of the steel product on the basis of the obtained measured-distance data. The steel-shape measurement device includes a laser rangefinder 5A, and a laser-beam absorber 8. The laser rangefinder 5A includes one laser light source 11, which emits laser beams, and a galvanometer mirror 13, which redirects the laser beams. The laser-beam absorber 8 is disposed at least one location within an irradiation range irradiated with laser beams regularly-reflected on the to-be-scanned surface of the steel product. The laser-beam absorber 8 has a 45°-0° diffuse reflectance of lower than or equal to 10%.

As illustrated in FIG. 1(a), the laser rangefinder 5A includes one laser light source 11 mounted on the turntable 12, and a known galvanometer mirror 13 at a laser-beam emitting outlet of the laser light source 11. A galvanometer-mirror rotation axis 13A forms an angle of 45° with a reflection surface of the galvanometer mirror 13, coincides with the optical axis of a laser beam from the laser-beam emitting outlet of the laser light source 11, and is perpendicular to a turntable rotation axis 12A. Thus, a laser beam from the laser light source 11 is reflected by the galvanometer mirror 13 to be redirected by 90°, and the redirected laser beam is incident on a to-be-scanned surface of a steel product to form an incident laser beam LS1. The optical path of the incident laser beam LS1 rotates with respect to an incident point on the galvanometer mirror 13, about the galvanometer-mirror rotation axis 13A together with the galvanometer mirror 13, and about the turntable rotation axis 12A together with the turntable 12. Specifically, the incident laser beam LS1 can travel three-dimensionally in all the directions with the rotation about the galvanometer-mirror rotation axis 13A and the rotation about the turntable rotation axis 12A. Thus, the laser rangefinder 5A is usable as a device for scanning three-dimensionally the steel product and measuring the distance in all the directions with laser beams.

As illustrated in FIG. 1(b), FIG. 1(c), and FIG. 1(d), the laser rangefinder 5A is located obliquely above the to-be-scanned surface of a steel product, such as a steel plate S, as a portion of the steel-shape measurement device 5. The laser rangefinder 5A is disposed while having the galvanometer-mirror rotation axis 13A perpendicular to the longitudinal direction of the steel plate S, and having the turntable rotation axis 12A perpendicular to the width direction of the steel plate S. Thus, the incident laser beam LS1 forms a light spot that travels over the steel plate S in the longitudinal direction with rotation about the galvanometer-mirror rotation axis 13A of the galvanometer mirror 13. The light spot moves in the width direction with rotation about the turntable rotation axis 12A of the turntable 12.

The steel-shape measurement device 5 scans the to-be-scanned surface of the steel plate S with the light spot in the longitudinal direction and the width direction to measure the distance to a detection spot group on the to-be-scanned surface of the steel plate S, and measures the shape of the steel plate S from the obtained measured-distance data using a computer system, not illustrated. The method for measuring the shape of the steel plate S from the obtained measured-distance data is similar to that of the reference technology A. Specifically, the method is the same as the one described in paragraphs 0013 to 0058 in Patent Literature 2, disclosed previously by the applicant.

The measured-distance data is calculated on the basis of measurements obtained by a diffusely-reflected-light measurement device (not illustrated) that measures the light intensity of primarily diffusely-reflected light, which is light diffusely reflected at the location of the light spot. However, when the to-be-scanned surface of the steel plate S has a substantially mirror-shaped portion, the incident laser beam LS1 regularly reflects at the substantially mirror-shaped portion and forms a regularly-reflected laser beam LS2. This regularly-reflected laser beam LS2 is incident on the surface of a surrounding instrument or device and diffused and reflected to form secondarily diffusely-reflected light. Furthermore, this secondarily diffusely-reflected light is incident on the surface of a surrounding instrument or device and repeatedly diffused and reflected to form tertiary or higher-order diffusely-reflected light (hereinafter the tertiary or higher-order diffusely-reflected light is referred to as "multiplex diffusely-reflected light"). When the primarily diffusely-reflected light and the secondarily diffusely-reflected light and/or multiplex diffusely-reflected light are superimposed, the measured-distance data is calculated based on the measurement of light intensity of the superimposed diffusely-reflected light. Unless the secondarily diffusely-reflected light has negligible light intensity with respect to the light intensity of the primarily diffusely-reflected light, the secondarily diffusely-reflected light and the multiplex diffusely-reflected light adversely affect the accuracy of the measured-distance data, and degrade the measurement accuracy of the shape of the steel plate S.

To address this problem, in Invention (1), the steel-shape measurement device 5 includes an object having a 45°-0° diffuse reflectance of lower than or equal to 10% to serve as the laser-beam absorber 8 at least one location within the irradiation range irradiated with the regularly-reflected laser beam LS2. Specifically, the steel-shape measurement device 5 includes the laser rangefinder 5A and the laser-beam absorber 8. Here, "45°-0° diffuse reflectance" refers to the measured amount of the ratio of the diffused light to the light incident on the surface, where the incident angle of the incident light with respect to the normal to the surface is denoted as 0°, and a received angle of diffused light is denoted as 45°. The diffuse reflectance depends on the wavelength of the used laser beam. Thus, laser beams having a wavelength the same as that of laser beams for actual scanning use are used in the diffuse reflectance measurement.

The laser-beam absorber 8 is preferably disposed at a location at which secondarily diffusely-reflected light with a light intensity that is so large as to be nonnegligible with respect to the light intensity of the primarily diffusely-reflected light is formed. Such a location may be appropriately selected within the irradiation range irradiated with regularly-reflected laser beams emitted from an abnormal area, which is detected as an area in which the measured-distance data from the laser rangefinder within the to-be-scanned surface of the steel plate varies excessively in the state where the laser-beam absorber is not installed.

Thus, the light intensity of the secondarily diffusely-reflected light from the location at which the laser-beam absorber 8 is disposed can be reduced to the negligible level with respect to the light intensity of the primarily diffusely-reflected light, so that the accuracy of the measured-distance data of the steel plate S improves, and the accuracy of the shape measurement of the steel plate S thus improves. The 45°-0° diffuse reflectance of larger than 10% has no such effect. Thus, this diffuse reflectance should be lower than or equal to 10%, preferably lower than or equal to 5%.

Examples of an object preferably usable as the laser-beam absorber include black polyvinyl chloride (45°-0° diffuse reflectance of 5%), black rubber (45°-0° diffuse reflectance of 8%), and black-paint coating (45°-0° diffuse reflectance of 1%).

Subsequently, an embodiment for Invention (2) will be described.

Figure 2:
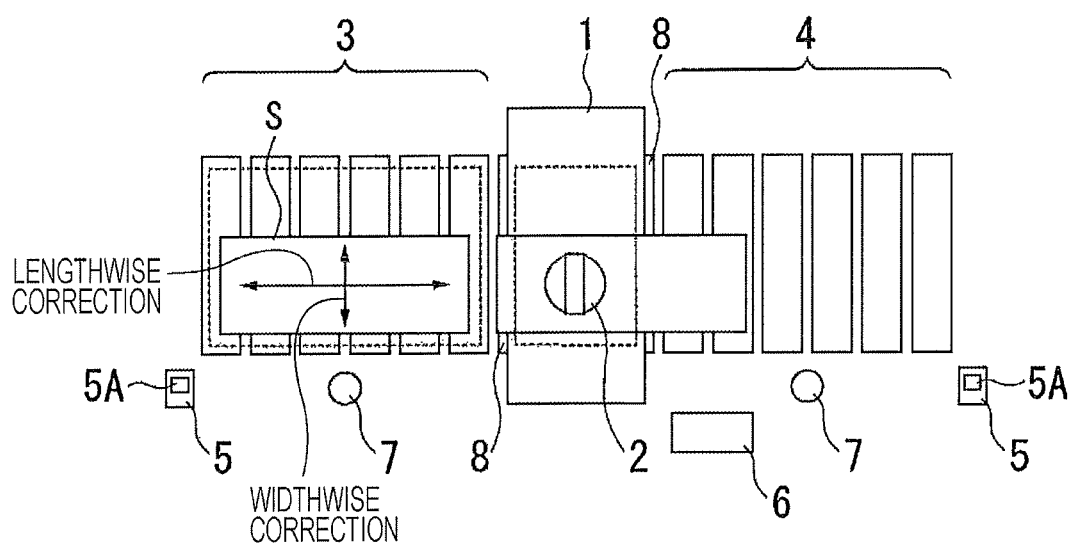
FIG. 2 is a plan view of a schematic structure of a steel-shape correction device according to an embodiment of Invention (2).

FIG. 2 is a plan view of a schematic structure of a steel-shape correction device according to Invention (2). The steel-shape correction device corrects the shape of the steel plate S off-line, and includes a press 1 that corrects the shape of the steel plate S. A bed 3 (entry-side bed 3) is disposed on the entry side of the press 1, and a bed 4 (exit-side bed 4) is disposed on an exit side of the press 1. The beds 3 and 4 each include multiple rollers for transporting the steel plate S. Controlling rotation of these rollers enables control on the transportation direction of the steel plate S. Specifically, these beds 3 and 4 constitute a transport device for the steel plate S. A position sensor 7, which detects the position of the steel plate S, is disposed on the side of each of the entry-side bed 3 and the exit-side bed 4. Each position sensor 7 scans the steel plate S in the transportation direction with laser beams to measure the shape of the steel plate S in the transportation direction to detect the position of the steel plate S from the shape measurement results.

The press 1 of the present embodiment presses the steel plate S with a pressing ram 2 from above to mainly exert a bending moment on the steel plate S to correct the shape of the steel plate S. The shape of the steel plate S is measured by the steel-shape measurement device 5 according to Invention (1). Examples of parameters for steel-plate shape correction include a framing-square gap obtained from the shape of the steel plate S (gap formed between the steel plate and a framing square [standard segment] of a predetermined length attached to the surface of the steel plate S), the pressure applied from the pressing ram 2, the positions of floor plates called shims and a gap between the shims, and the position of the steel plate S. Steel-plate shape correction performed by the press 1 according to the present embodiment includes placing two shims under the steel plate S, and pressing the portion of the steel plate S between the shims with the pressing ram 2. The bending moment of the pressing ram 2 is exerted on the portion of the steel plate S between the shims. The above-described various parameters are adjusted in consideration of the amount of deformation of the steel plate S due to the bending moment and the restoring amount after pressure removal, or a so-called spring-back amount.

The steel-shape measurement device 5 according to Invention (1) is disposed obliquely above each of the entry-side bed 3 and the exit-side bed 4. The steel-shape measurement device 5 disposed obliquely above the entry-side bed 3 measures the shape of a steel product before shape correction, adjusts the various parameters for the steel-plate shape correction on the basis of the shape data, and performs shape correction. The steel-shape measurement device 5 disposed obliquely above the exit-side bed 4 checks the shape of the corrected steel plate. The directions of the galvanometer-mirror rotation axis 13A (not illustrated in FIG. 2) and the turntable rotation axis 12A (not illustrated in FIG. 2) of the laser rangefinder 5A with respect to the longitudinal direction and the width direction of the steel plate S are similar to those illustrated in FIG. 1. Thus, the steel-shape correction device according to aspects of the present invention includes the steel-shape measurement devices 5, the press 1, and the transport device. The laser rangefinder and the laser-beam absorber of the steel-shape measurement device are disposed on each of the entry side and the exit side of the press 1.

In the embodiment illustrated in FIG. 2, in accordance with Invention (3), the laser-beam absorbers 8 are installed at locations within a regularly-reflected-light irradiation range of outer surfaces of the press 1 within which the laser beam from each laser rangefinder 5A is regularly reflected off the to-be-scanned surface of the steel plate S, that is, an entry-side surface, an exit-side surface, and side surfaces of the press 1 on which regular reflection light impinges. This structure is made based on the following finding of the applicant. The applicant has conducted an experiment for detecting an area within a irradiation range irradiated with a regularly-reflected laser beam where secondarily diffusely-reflected light adversely affects the measured-distance data to a nonnegligible level without the laser-beam absorber 8 being installed (the area is referred to as "area of interest"). Among the outer surfaces of the press 1, the detected area of interest extends over the entry-side surface, the exit-side surface, and the side surfaces on which the regular reflection light impinges.

In this embodiment, the laser-beam absorbers 8 are disposed on the entry-side surface, the exit-side surface, and the side surfaces on which regular reflection light impinges among the outer surfaces of the press 1. However, the positions at which the laser-beam absorbers 8 are installed are not limited to the above example. For example, shielding walls that prevent regular reflection from the steel plate S from impinging on the entry-side surface, the exit-side surface, or the side surfaces of the press 1 may be disposed on the entry side and the exit side of the press 1, and the laser-beam absorbers 8 may be disposed on the surfaces of the shielding walls opposing the laser rangefinders 5A.

The laser-beam absorbers 8 may be disposed on partial areas of the entry-side surface, the exit side surface, and the side surface of the press 1, in a case where the secondarily diffusely-reflected light within the area of interest is caused only on the partial areas.

When the surfaces on which secondarily diffusely-reflected light is caused within the area of interest are surfaces of instruments or devices other than the press 1, preferably, the laser-beam absorbers 8 may naturally be disposed on these surfaces.

Figure 3:
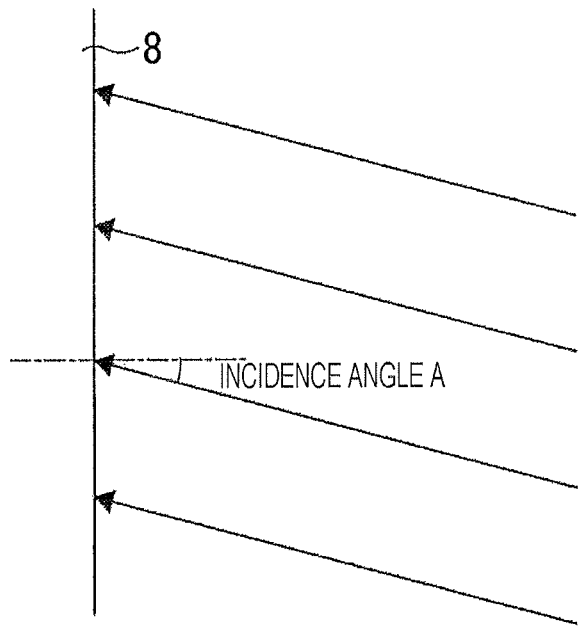
FIG. 3 includes cross-sectional views of an example A (FIG. 3(a)) and an example B (FIG. 3(b)) of the shape of an incident-reflection surface of a laser-beam absorber.
Figure 3:
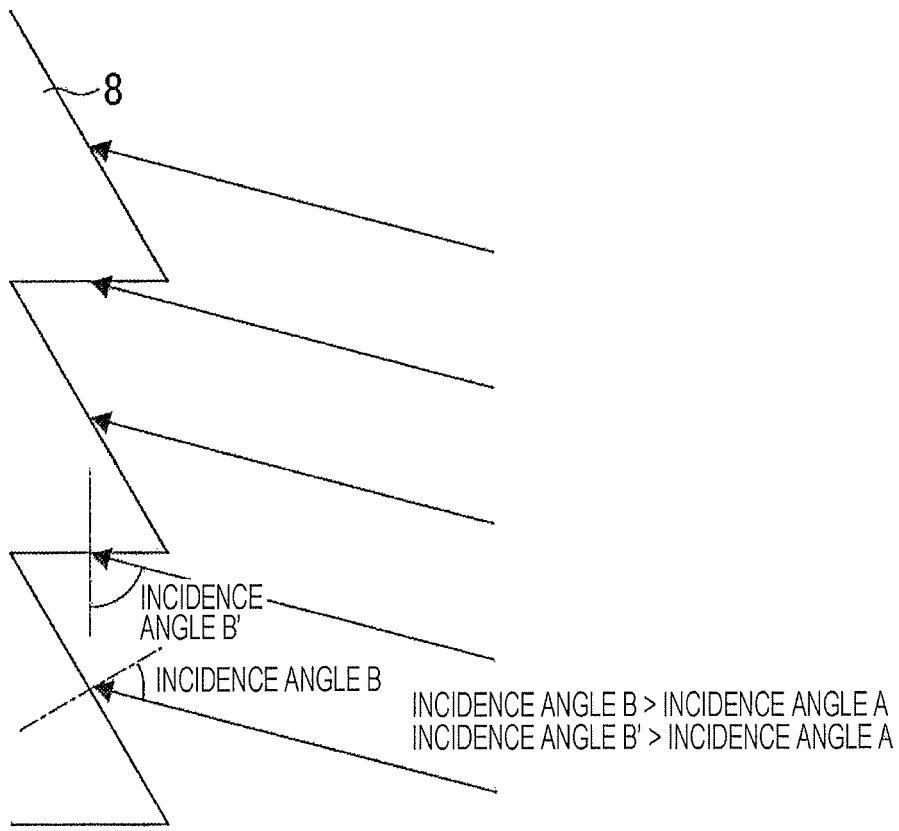

Generally, when the incident light is incident on an incident-reflection surface and forms diffusely-reflected light, the incident light having a larger incident angle forms diffusely-reflected light with smaller light intensity. Thus, the incident-reflection surface of the laser-beam absorber having such a shape as to allow the regularly-reflected laser beam to be incident thereon at a larger incident angle (for example, an incident angle exceeding 45°) is preferable in terms of further reduction of light intensity of the secondarily diffusely-reflected light. Examples of the shape of the incident-reflection surface of each laser-beam absorber 8 include a flat incident-reflection surface illustrated in FIG. 3(*a*) as the example A, and a sawtooth incident-reflection surface illustrated in FIG. 3(*b*) as the example B. When the example A and the example B are compared, an incident angle B and an incident angle B' at which a regularly-reflected laser beam LS2 is incident from obliquely below on the example B are larger than an incident angle A at which the regularly-reflected laser beam LS2 is incident from obliquely below on the example A. Thus, the example B is more preferable.

A control device 6 including a computer system that performs processing for shape correction on the steel plate S with the press 1 is disposed on the side of the exit-side bed 4. This processing is described in detail in paragraphs 0059 to 0065 in Patent Literature 2.

EXAMPLE

The present invention example has a form illustrated in FIG. 2 as an example. Here, the steel plate S is placed on the exit-side bed 4 of the press 1. Laser beams emitted from the laser rangefinders 5A for scanning the steel plate S are near infrared laser beams having a wavelength of 1550 nm. Among the outer surfaces of the press 1, on the entry-side surface and the exit-side surface identified as locations within the area of interest within the irradiation range irradiated with the regularly-reflected laser beams from the steel plate S, the laser-beam absorbers 8 made of black polyvinyl chloride having a 45°-0° diffuse reflectance of 5% are disposed. The incident-reflection surfaces of the laser-beam absorbers 8 have the shape the same as that of the example B (sawtooth shape) illustrated in FIG. 3(*b*).

An existing example, on the other hand, has a form similar to that of the present invention example except for excluding the laser-beam absorbers 8 from the present invention example.

Figure 4:
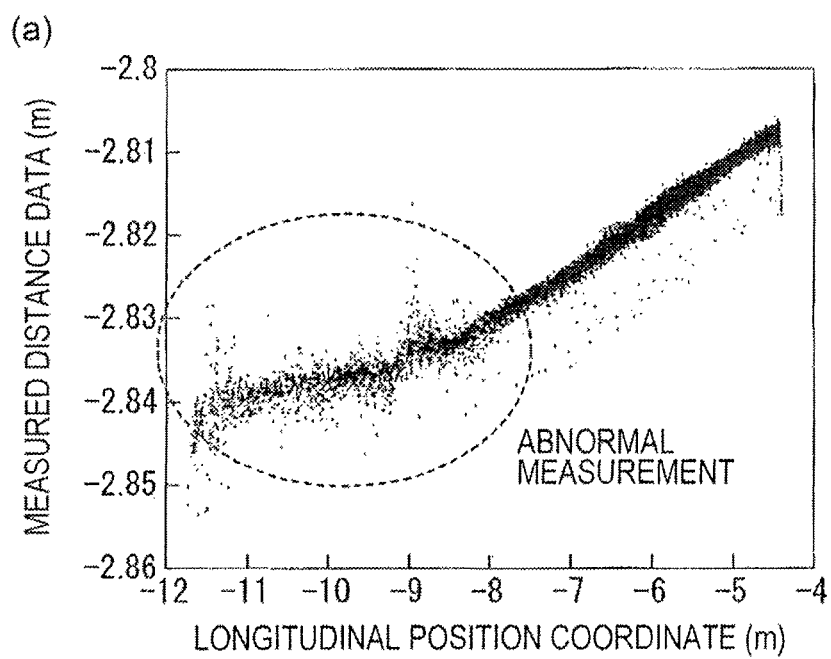
FIG. 4 includes graphs showing examples of measured-distance data for an existing example (FIG. 4(a)) and a present invention example (FIG. 4(b)).
Figure 4:
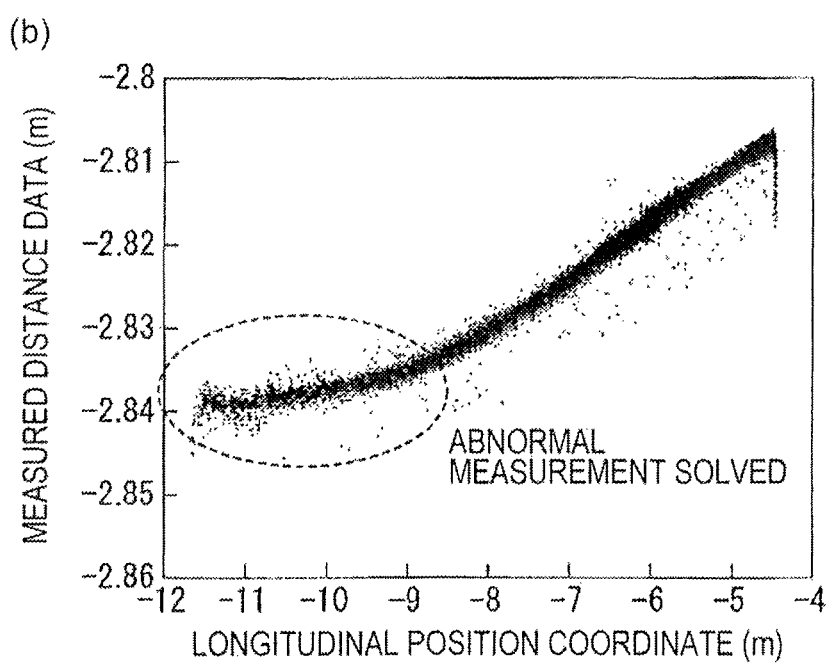

As illustrated in FIG. 4(*a*) by way of example, the existing example has caused abnormal measurements, which are measured-distance data excessively varying beyond a normal variation range, at a substantially mirror-shaped part of the steel plate S in the longitudinal direction. The abnormal measurements are caused because the exit-side surface of the press 1 is located within the irradiation range irradiated with the regularly-reflected laser beams from the substantially mirror-shaped part of the steel plate S, and secondarily diffusely-reflected light from the exit-side surface is superimposed on primarily diffusely-reflected light from the mirror-shaped part of the steel plate S to largely vary the measured-distance data.

Figure 5:
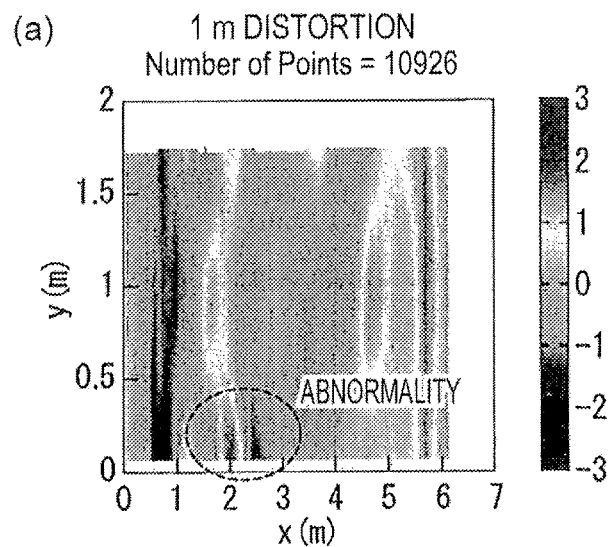
FIG. 5 includes images of outputs of unevenness distribution information over the steel plate surfaces of an existing example (FIG. 5(a)) and a present invention example (FIG. 5(b)).
Figure 5:
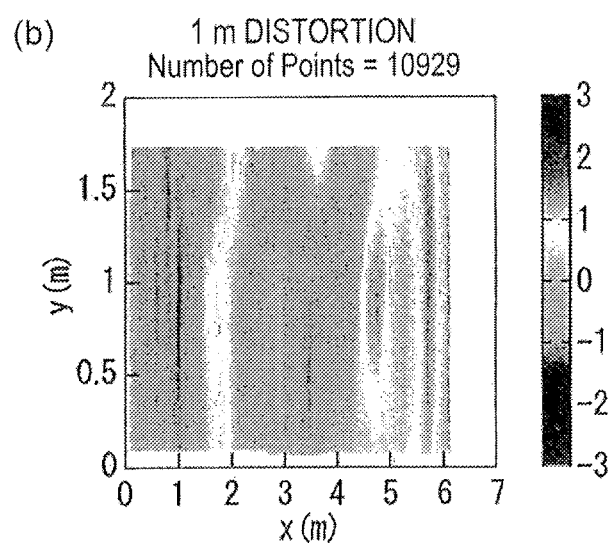

As illustrated in FIG. 5(*a*) by way of example, steel-shape measurement results derived from the measured-distance data including the abnormal measurements include those of the abnormal area departing from the real shape, and hinder appropriate shape correction on the steel plate S.

The present invention example, in contrast, includes the above-described laser-beam absorbers 8. Thus, as illustrated in FIG. 4(*b*) by way of example, the present invention example has no abnormal measurements throughout the entire range of the steel plate S in the longitudinal direction, unlike in the existing example. Thus, as illustrated in FIG. 5(*b*) by way of example, steel-shape measurement results derived from measured-distance data without such abnormal measurements do not include those of the abnormal area departing from the real shape, and easily enables appropriate shape correction on the steel plate S.

REFERENCE SIGNS LIST

1 press
2 pressing ram
3 bed (entry-side bed)
4 bed (exit-side bed)
5 steel-shape measurement device
5A laser rangefinder
6 control device
7 position sensor
8 laser-beam absorber
11 laser light source
12 turntable
12A rotation axis of turntable
13 galvanometer mirror
13A rotation axis of galvanometer mirror
LS1 incident laser beam
LS2 regularly-reflected laser beam
S steel plate

The invention claimed is:

1. A steel-shape measurement device that measures a distance to a detection spot group on a to-be-scanned surface of a steel product with a laser rangefinder that measures the distance through scanning of the steel product with a laser beam redirected with a galvanometer mirror after emitted from one laser light source, and measures a shape of the steel product from obtained measured-distance data, the steel-shape measurement device comprising:
   an object having a 45°-0° diffuse reflectance of equal to or lower than 10% as a laser-beam absorber at least at one location within an irradiation range irradiated with a regularly-reflected laser beam from the to-be-scanned surface of the steel product.

2. A steel-shape correction device including a press and transport devices that are disposed on an entry side and an exit side of the press to transport a steel product, the press including a pressing ram, the steel-shape correction device comprising:
   the steel-shape measurement device according to claim 1 on the entry side and the exit side of the press.

3. The steel-shape correction device according to claim 2, wherein a location at which the laser-beam absorber of the steel-shape measurement device is disposed includes a location on a surface of outer surfaces of the press within the irradiation range.

\* \* \* \* \*